United States Patent [19]

Jabarin

[11] Patent Number: 4,512,948
[45] Date of Patent: Apr. 23, 1985

[54] METHOD FOR MAKING POLY(ETHYLENE TEREPHTHALATE) ARTICLE

[75] Inventor: Saleh A. Jabarin, Holland, Ohio
[73] Assignee: Owens-Illinois, Inc., Toledo, Ohio
[21] Appl. No.: 354,473
[22] Filed: Mar. 3, 1982
[51] Int. Cl.³ .............................................. B29C 17/07
[52] U.S. Cl. .................................... 264/521; 264/523; 264/526; 264/528; 264/529; 264/532
[58] Field of Search ............... 264/523, 526, 528, 529, 264/535, 537, 538, 540, 520, 521, 532

[56] References Cited

U.S. PATENT DOCUMENTS 4,385,089  5/1983  Bonnebat et al. ............... 264/523 X Primary Examiner—Jan Silbaugh
Attorney, Agent, or Firm—Thomas L. Farquer; M. E. Click

[57] ABSTRACT

Disclosed is a process of making an oriented and heat set blow molded bottle of poly(ethylene terephthalate) so that the bottles resulting from the process have a density over 1.3860 cc./gm. and an onset-of-shrinkage temperature over 80° C. In the process preform preheated to a temperature suitable for orientation is biaxially stretched in a blow mold and then while the hollow article walls are still in contact with the blow mold walls, the article is raised to a higher heat setting temperature in the range of 200°–250° C. (except for the neck) thus heat setting the bottle, and while the article is still at a shrinkage resisting pressure exceeding atmospheric cooling the article to a temperature at which it maintains its shape when not pressurized but not below 100° C. It is also particularly disclosed that this cooling step can be done outside the mold. In a special embodiment of the invention where the cooling step is effected outside the mold, the cooling under the shrinkage resisting pressure is below 100° C., even down to room temperature and lower, before the shrinkage resisting pressure is released from the hollow article.

7 Claims, 3 Drawing Figures

METHOD FOR MAKING POLY(ETHYLENE TEREPHTHALATE) ARTICLE

This invention relates to improved methods of making hollow, biaxially oriented, heat set partially crystalline articles. In another aspect it relates to biaxially oriented, heat set hollow poly(ethylene terephthalate) articles having a density of over 1.3860 and low permeabilities to carbon dioxide and oxygen gases, and also having a high "onset-of-shrinkage" temperature compared with hollow articles heat set according to prior art processes.

In order to improve several physical properties of hollow articles such as bottles made from poly(ethylene terephthalate), it has been suggested that biaxially oriented poly(ethylene terephthalate) hollow articles, made by orientation blow molding of a preform or parison under conditions to provide biaxial orientation and concomitant crystallization, be further heat treated at higher temperatures than the orientation blowing temperature to further increase the density (or crystallinity) of the hollow article. Such increasing of the density or crystallinity by heating after shaping under orientation conditions is commonly known as heat setting.

Wyeth et al. in U.S. Pat. No. 3,733,309 suggests such a process. However, the heat setting process is mentioned only in passing and no specific examples including heat setting are present in the patent. Of course, the extra step would ordinarily add considerable expense to the bottle making process.

Collins in U.S. Pat. No. 4,039,641 discloses heat setting containers of an organic synthetic thermoplastic polymeric material. Among such materials disclosed are high density polyethylene, polypropylene homopolymers and copolymers and polyesters such as poly(ethylene terephthalate) and poly(butylene terephthalate), including copolyesters such as ethylene terephthalate/isophthalate copolymers. In a preferred embodiment, heat setting is accomplished by blowing the plastic parison in a heated blow mold, preheated to the heat setting temperature.

It is stated in Collins that the heat setting temperature used is that normally encountered in heat setting of oriented films or fibers made from the given plastic material. It is not stated, however, what heat setting temperatures are "normal" for making oriented films or fibers from poly(ethylene terephthalate). See Collins, infra. However, for this plastic it is disclosed in Collins that the mold is preferably maintained at 130° to 220° C.

It is disclosed in Collins that after heat setting, the container should be cooled down to a temperature, for instance, below about 60° C. In one example of Collins, the heat setting temperature of the mold is 200° C. and in the other, it is 140° C.

In unexamined Japanese Patent Application No. 146,175, laid open Nov. 15, 1980, containers are stretch blow molded under conditions to biaxially orient the polyester molecules. It is explained that as a result of the stretch blow molding, the residual strain was large and that when heated subsequent to the molding, the residual strain was released, causing deformation of the container. To solve this problem, the reference recommends heat setting the containers after blow molding. It is also recommended that the heat setting temperature in unstretched areas such as the neck be held to 95°–125° C. so that hazing will not occur in these areas. Other areas are heat set at a higher temperature. It is recommended that the heat setting of the highly strained areas of the container be in the range from 125° C. to 235° C. However, quenching of the heat set container at 100° C. or above is not disclosed.

Unexamined Japanese Patent Application No. 77,672, laid open June 21, 1979, is similar except that it is not taught to heat set unoriented parts at a lower temperature than other parts. The highest temperature disclosed for heat setting is 130° C. and in the only specific example the oriented blow molded bottle is heat set by contacting with the hot blow mold kept at 130° C. and then lowering the mold temperature to 100° C. to prevent bottle deformation when the bottle is discharged from the mold. In this reference, it is stated that hazing occurs when higher heat setting mold temperatures are used. The reference does not disclose the present method or the novel products of the present invention.

In unexamined Japanese Patent Application No. 21,463, laid open Feb. 17, 1979, a blown poly(ethylene terephthalate) bottle was heat set by heating the bottle to 140° C. while still within the blow mold.

In unexamined Japanese Patent Application No. 78,267, laid open June 11, 1978, there is disclosed stretch blow molding a thermoplastic resin, in the example specifically poly(ethylene terephthalate) to make a hollow article, and while the article is still in the mold to introduce hot gases for purposes of heat setting. In the example, the hot gas is at 180° C. The example does not disclose cooling the heat set article before removal from the mold, but the description of the drawing does describe this as an alternative treatment, using normal temperature compressed gas to cool the molded piece.

In unexamined Japanese Patent Application No. 66,968, laid open May 29, 1979, methods of reducing residual strain in biaxially oriented blown bottles are disclosed. The methods are applied to unidentified, saturated polyester resins. In all of the methods the bottle is heated, after being formed by biaxial orientation blow molding by one method or another. After the heat treatment the bottle is cooled, but the temperature to which the bottle is cooled is not disclosed. The heating step apparently includes heating the neck portion of the bottle, since in one method the heating is by passing steam through channels 8 which include channels 8 next to the neck, and in another method heating is carried out by high temperature pressurization of the interior of the bottle, which of course includes the neck.

In unexamined Japanese Patent Application No. 78,268, laid open June 11, 1978, a stretch blow molded hollow body, including those made from poly(ethylene terephthalate) is heat set by introducing hot gas under pressure into the interior of the bottle while in the mold. After the heat setting, normal temperature gas can be optionally blown into the article to cool the article before removal from the mold, or the heat set body can simply be exhausted to atmospheric. In an example, the heated gas for heat setting is at 200° C. In the specific example, no cooling before removal from the mold was disclosed. Again, the heating includes heating of the neck portion of the bottle.

In unexamined Japanese Patent Application No. 41,973, laid open Apr. 3, 1979, it is disclosed to heat set stretch blow molded containers, including those made from poly(ethylene terephthalate) by heating the blown containers at a high temperature and then rapidly cooling them to room temperature. Heat treatment can be within the mold while under pressure and the heating can be by means of a hot mold. It is disclosed that the heat treatment should be such that the density of the bottle body following the heat treatment is no greater than 1.40 gms./cc. In the example given, steam at 179° C. is used for heating the mold in the heating step.

Scarlett U.S. Pat. No. 2,823,421 discloses heat setting of PET films using heat setting temperatures of 150°–250° C. after orientation stretching. This patent does not state, however, what "normal" PET film heat setting temperatures are. It does disclose that for a film stretched three times in each direction that a heat setting temperature of 200° C. is preferred by Scarlett.

German Pat. No. 2,540,930 discloses heat setting of hollow articles. The blank or parison is blow molded at 70°–140° C. and then cooled in the mold to below 70° C. Thereafter, the bottle can be reheated to heat setting temperature in that mold or in a different mold. The heat setting temperature is said to be over 140° C. or higher. In the disclosed process the entire bottle including the neck is heated in the heat setting step to the same temperature and the neck of the bottle crystallizes to an opaque state.

In Brady et al. U.S. Pat. No. 4,233,022 a bottle oriented by blow molding PET at 75°–100° C. is heat set. Heat setting is accomplished in a hot mold at a suitable heat setting temperature; examples of such temperatures are given as 150° to 220° C. The patent features controlling different zones of the bottle at different temperatures, so that all the sidewall of the bottle is at the maximum heat setting temperatures being used, but the finish or neck, for instance, is actually cooled to prevent crystallization thereof. In this patent after the heat setting step, it is stated that the bottle is cooled to a self-sustaining condition.

In one embodiment the present process features biaxially orienting a parison preheated to orientation temperature, by inflating in a blow mold which has been preheated to the higher, heat setting temperature and holding the bottle or other hollow article against the mold wall for the short time necessary to effect heat setting. The process of the present invention also features thereafter cooling the heat set hollow article or bottle while under pressure but not below 100° C. and then exhausting the pressure in the bottle to essentially atmospheric or ambient pressure before further cooling of the article below 100° C. takes place.

The prior art merely discloses that the bottle needs to be cooled to a self-sustaining condition or it discloses that it must be cooled to some specific temperature which is obviously very low and at which such bottles are self-sustaining.

For instance, Collins U.S. Pat. No. 4,039,641 specifically discloses cooling to below 60° C. and in one specific example cools to 40° C., before releasing the gas pressure.

I have found that the "onset-of shrinkage" temperature for the heat set sidewall of the poly(ethylene terephthalate) hollow articles or containers of the invention depends on the density of the sidewall and the temperature to which the hollow article is cooled before the inflating pressure of the article is exhausted to essentially atmospheric pressure.

The onset-of-shrinkage temperature referred to herein was determined as described in Brady and Jabarin "Thermal Treatment of Cold-Formed Poly(Vinyl Chloride) Polymer Engineering and Science", pp. 686–90 of Vol. 17, No. 9, September, 1977, except that the samples were cut from the sidewalls of the bottles. No thermal treatment was effected on the cut samples prior to the tests.

Ordinarily, when a PET bottle is blown in a blow mold, it is cooled to quite a low temperature, a temperature very much below the temperature at which the bottle would be self-sustaining, in fact much below the temperature at which the bottle will shrink at all when the pressure is released. According to an important feature of the present invention, I cool the heat set bottle, while still under pressure preventing shrinkage, to a temperature which will allow the volume of the hollow article to shrink no more than 6 percent, preferably 5 percent, when the pressure is removed and allowed to cool to room temperature, but no lower than 100° C., before releasing the pressure to equalize it with the ambient atmosphere. I have discovered that cooling under pressure, i.e. when not allowing shrinkage, below 100° C. progressively reduces the onset-of-shrinkage temperature even when the final room temperature volume remains the same and does not decrease with decreasing "quench" temperature. Thus, referring to the tables described hereafter, it will be seen that the volume remains essentially constant for quench temperatures of 90° C. and below but that the onset-of-shrinkage temperature becomes progressively lower. It has also been found that the trend continues above 100° C. quench temperature, i.e. that the onset-of-shrinkage temperature increases as the quench temperature increases above 100° C.

One advantage of the present process is that a great decrease in cycle time is obtained in my heat setting process over processes disclosed or suggested in the prior art, because the bottle is left in a mold only for the time necessary to cool it to the relatively high temperature range before indicated, so that the next cycle can be immediately started; or the bottle can be immediately removed from the mold in one embodiment without cooling.

The process of the present invention, as well as the product, is concerned with polymers of poly(ethylene terephthalate) having an inherent viscosity of at least 0.6. Poly(ethylene terephthalate) polymers useful in the present invention includes polymers where at least 97% of the polymer contains the repeating ethylene terephthalate units of the formula:

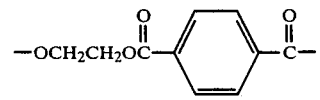

with the remainder being minor amounts of ester-forming components, and copolymers of ethylene terephthalate wherein up to about 10 mole percent of the copolymer is prepared from the monomer units selected from butane-1,4-diol; diethylene glycol; propane-1,3-diol; poly tetramethylene glycol); poly ethylene glycol); poly(propylene glycol); 1,4-hydroxymethylcyclohexane and the like, substituted for the glycol moiety in the preparation of the copolymer, or isophthalic; naphthalene 1,4- or 2,6-dicarboxylic; adipic; sebacic; decane-1,10-dicarboxylic acids, and the like, substituted for up to 10 mole percent of the acid moiety (terephthalic acid) in the preparation of the copolymer.

Of course, the poly(ethylene terephthalate) polymer can include various additives that do not adversely affect the polymer. For instance, some such additives are stabilizers, e.g., antioxidants or ultraviolet light screening agents, extrusion aids, additives designed to make the polymer more degradable or combustible, and dyes or pigments. Moreover, cross-linking or branching agents such as are disclosed in U.S. Pat. No. 4,188,357 can be included in small amounts in order to increase the melt strength of the poly(ethylene terephthalate).

It is an object of the present invention to provide an improved manipulative process for producing poly(ethylene terephthalate) hollow articles which are biaxially oriented, heat set and highly crystalline as indicated by density, which process results in a maximum efficiency of production.

It is another object of the present invention to provide a process for producing a poly(ethylene terephthalate) hollow article having superior oxygen and carbon dioxide permeability properties and having increased thermal stability (high onset-of-shrinkage temperature). It is a further object to provide such poly(ethylene terephthalate) hollow articles having a combination of such superior properties never before disclosed in the art. The highly crystalline nature of such new products and the permeability properties are directly related to their density, so that the new products of the present invention have high densities and consequently low permeabilities coupled with higher onset-of-shrinkage temperatures not known in the prior art for heat set poly(ethylene terephthalate) hollow articles.

Other objects, as well as aspects and advantages, of the present invention will become apparent from a study of the specification.

In one of its broadest aspects the process of the invention comprises (1) biaxially orienting the body of a hollow article by blow molding a hollow poly(ethylene terephthalate) preform preheated to a suitable orientation temperature range, (2) while said article is still under pressure sufficient to maintain its essential size and shape, heating to a higher temperature in the range 200° to 250° C. the portions thereof that it is desired to crystallize, thereby increasing the density of such portions, and (3) while said article is still under a pressure sufficient to maintain its essential size and shape, cooling said article to a temperature at which it maintains its shape even without internal pressure above atmospheric but not below 100° C., and (4) thereafter exhausting the pressure from the hollow article at said temperature and allowing the article to cool further while not under internal pressure. Steps (3) and (4) result in a heat set article having a higher "onset-of-shrinkage" temperature than if all cooling or quenching be done under pressure down to ambient temperature.

According to an important aspect of the present invention I have provided a method of making a high density, partially crystalline, biaxially oriented hollow poly(ethylene terephthalate) plastic article having a neck or finish portion comprising (1) enclosing a tubular parison of said poly(ethylene terephthalate), having a closed end and an open end destined to form the neck or finish of the hollow article, within a blow mold, which parison is at a first temperature range, which first temperature range is conducive to orientation during stretching, (2) while said parison is still at said first temperature range expanding said parison into contact and conformance with the blow mold walls by inflation with a gas under pressure to make a hollow blown article, said stretching and expanding under the resulting strain conditions resulting in biaxial orientation and concomitant partial crystallization, and then while the article walls are still inflated in contact with said mold walls, raising the temperature of the article to a higher second temperature in the range 200° to 250° C., except for the neck or finish portion of said article which is kept at a low temperature such that crystallization is minimized or eliminated so that the neck or finish portion remains transparent; this temperature is usually in the range of 40°–125° C., more usually 40°–80° C., but any non-crystallizing temperature of 125° C. or below can be used, (3) wherein the heating in said second temperature range heat sets the body of said article by causing further crystallization thereof as indicated by density increase, (4) and while said hollow article is still at a shrinkage-resisting pressure exceeding atmospheric, cooling said article to a temperature at which it maintains its shape when not pressurized but not below 100° C., and (5) thereafter reducing the gas pressure within said article to essentially ambient pressure.

According to another aspect of the present invention, there is provided new a product which is the product of the foregoing process: a transparent hollow article of poly(ethylene terephthalate) having an inherent viscosity of at least 0.6 dl./gm., the body portion of said article being biaxially oriented and heat set and having a density over 1.3860 gm./cc. and an onset-of-shrinkage temperature of over 80° C.

In a preferred embodiment of the present process the heat setting second temperature is in the range of 225° to 250° C. The product of this preferred process is a transparent hollow article of poly(ethylene terephthalate) having an inherent viscosity of at least 0.6 dl./gm., the body portion of said article being biaxially oriented and heat set and having a density over 1.3930 gm./cc. and an onset-of-shrinkage temperature of over 105° C.

Thus, the present process of orientation blow molding and heat setting not only produces articles with increased density (crystallinity), with the known decrease in oxygen and carbon dioxide permeabilities but it also has the following advantages over the prior art:

(1) increased productivity rate because of decreased cycle time, (2) compared to prior art heat set PET bottles, higher onset-of-shrinkage temperatures, important for hot-fill packaging of fluid products, and (3) energy savings because of lack of necessity to repeatedly cool the mold to low temperatures each cycle.

FIGS. 1, 2 and 3 are each the same view looking at the flat side of one-half of a split blow mold, each showing the hollow plastic in various stages.

Thus, in FIG. 1 the parison 1 is shown after it is enclosed in the two halves of the split blow mold but before any air pressure has been applied.

Figure 1:
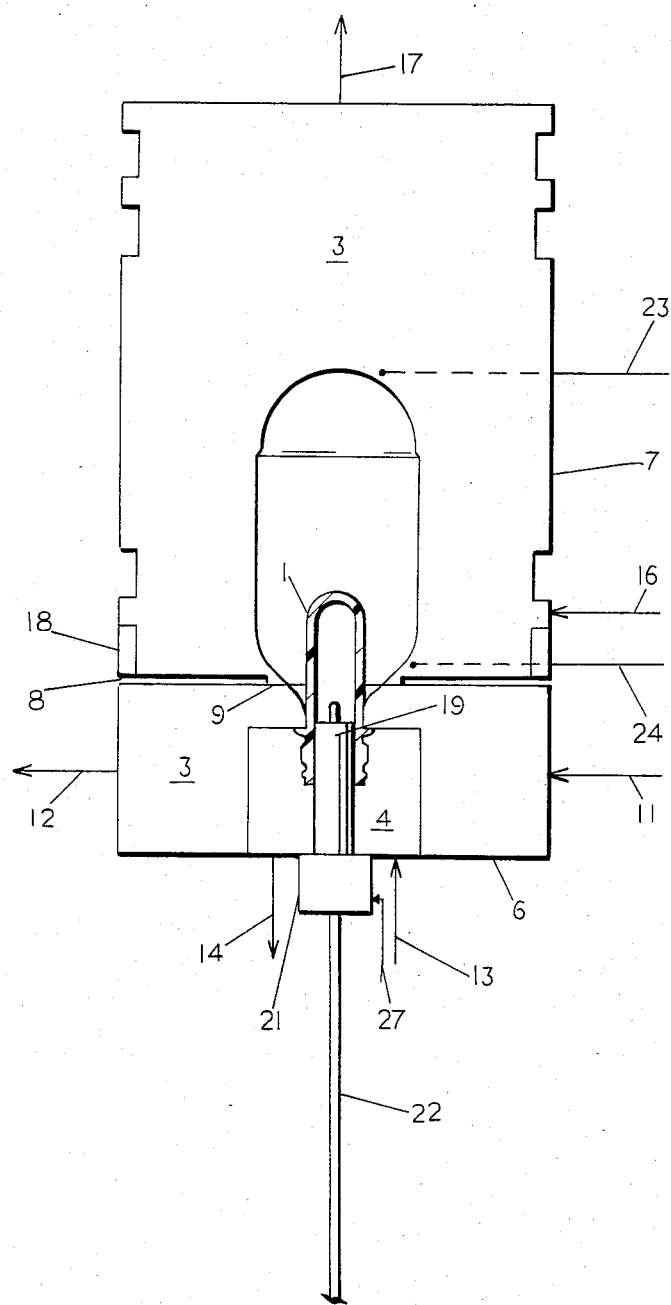

The apparatus shown in the drawings and the description of its operation herein are suitable for effecting the process of, and making the product of, the present invention, and were used in the specific examples discussed hereafter. However, other specific blow molding apparatus can of course be used to effect the orientation blow molding at one temperture, heat setting at a higher temperature and subsequent cooling under shrinkage-resisting pressure to a desired temperature according to the invention and, finally, the exhausting of the internal pressure from the hollow article.

In the drawings, 3 is body of the blow mold (i.e., one-half thereof), made up of neck ring 4, lower section 6 and upper section 7. Sections 6 and 7 are mostly separated by air gap 8 to minimize heat conduction therebetween and 6 and 7 are in physical contact only at narrow annular band 9. Lines 11 and 12 are provided for introducing cooling water into and from, respectively, channels (not shown) in 6. Lines 13 and 14 are provided for introducing cooling water into and from, respectively, neck ring 4 (one of the split halves of which is depicted in the figures). Lines 16 and 17 are for introducing oil for heating or cooling the mold, as the case may be, into and from the mold, respectively. Each of 11, 13 and 16 are connected to an appropriate source (not shown) of fluid under pressure.

Electric resistance strip heater 18 encircles the bottom of section 7 and is used to help make up for loss of heat flowing vertically from section 7 to section 6.

Blow mandrel 19 is shown inserted in parison 1; the blowing air is introduced into parison 1 via line 27 through cylinder 21 and passageways (not shown) in the end of mandrel 19, and the same passageways serve for exhaustion of air from the blown article. Cylinder 21 contains a mechanism which includes a piston (not shown) that has an O-ring that forms a seal against the top of the mandrel during operation. Stretch rod 22 is vertically movable through 21 and 19 by means not shown.

In operation a preheated injection molded parison 1 is enclosed in the split blow mold as shown in FIG. 1 and the mandrel is inserted. The upward progress of stretch rod 22 is begun a split second before introduction of blowing air through mandrel 19 and then the blowing air is introduced to blow the bottle against the walls of the mold. The stretch rod during initial blowing arrives at the position shown in FIG. 2 and is retracted before the blowing air is evacuated. The neck or finish area during the entire process is kept cool by the circulating cool water flowing through the halves of upper mold sections 6 and neck ring halves 4. During the orientation blowing and heat setting step, section 7 is maintained at the desired heat setting temperature by circulating hot oil through 16, 7 and 17 and by heating the lower part of section 7 with resistance heater 18.

Figure 2:
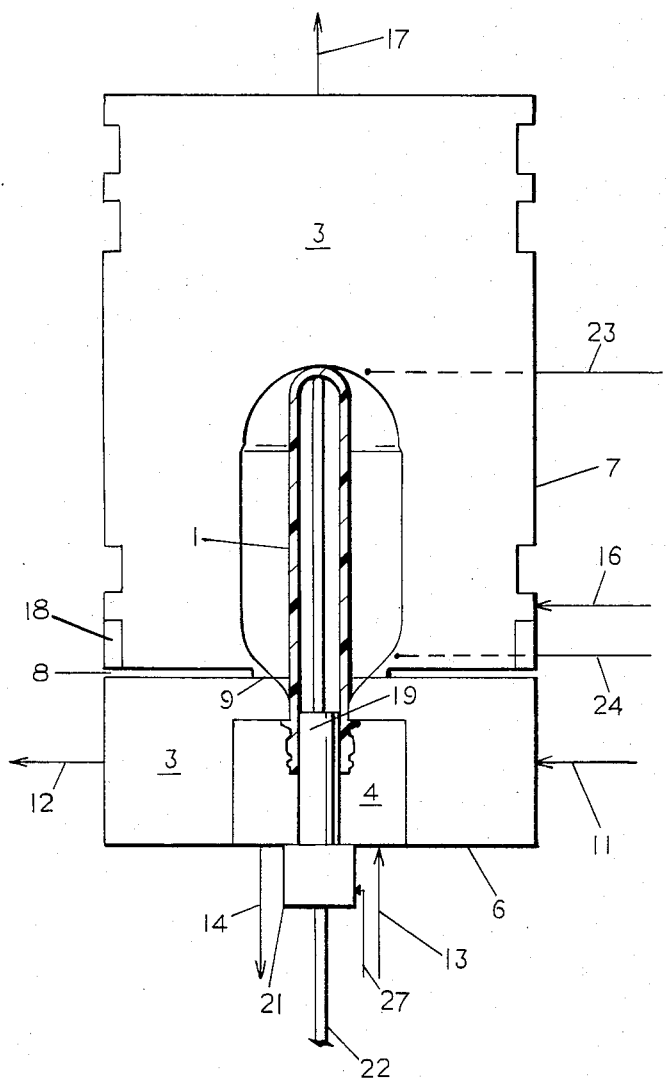
FIG. 2 shows parison 1 extended by the blow pin.

While FIG. 2 shows parison 1 elongated without any increase in the hoop direction, undoubtedly 1 is actually partly inflated before it reaches the position shown in FIG. 2, so that axial mechanical stretching and pneumatic inflation are occurring together. Although my apparatus was run as described here and as described in connection with the examples, it is equally possible (1) to complete the axial mechanical stretching before beginning pneumatic inflation, or, on the other hand, (2) not to use any mechanical axial stretching with the stretch rod at all; indeed, many commercial biaxially oriented bottles are made by blow molding without the use of any mechanical axial stretching.

In the drawings 23 and 24 are thermocouples positioned as shown and ⅛ inch from the mold cavity wall. In extensive testing, it was shown that the temperature varied only about 4° to 5° F. between the two thermocouples with the hottest temperature being at 23 near the bottom of the bottle.

After heat setting for the desired time, the hot oil is displaced by a continuous flow of room temperature oil to cool the bottle to the desired "quench" temperature as determined by the average of the two thermocouple temperatures. Then the pressure is released and the mold opened.

Figure 3:
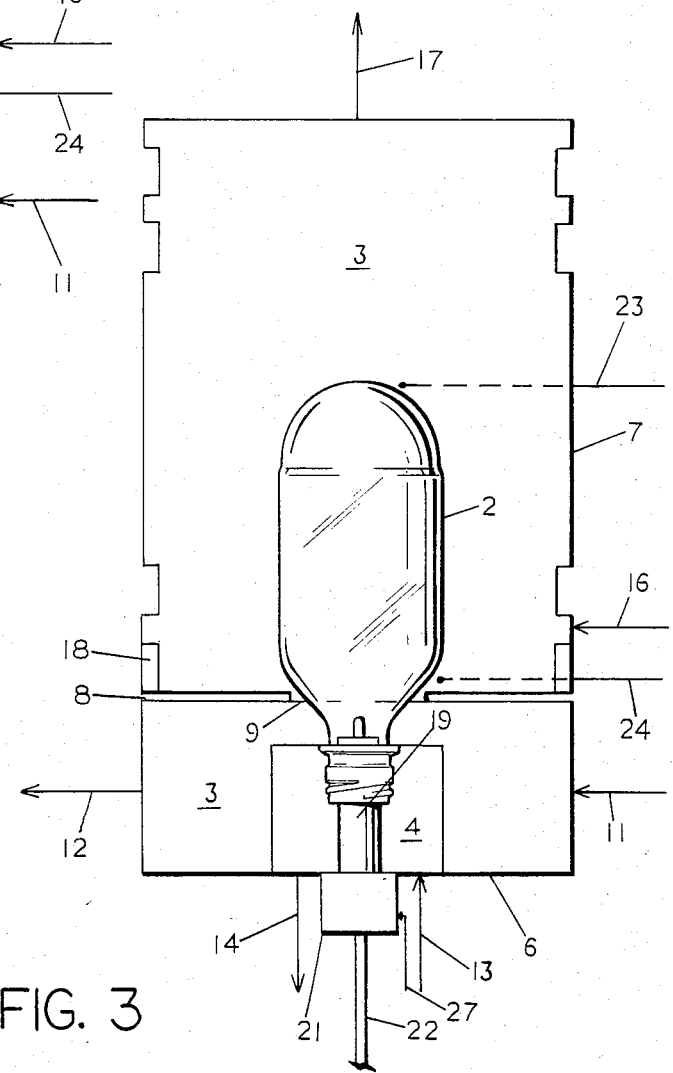
FIG. 3 shows the completely blown bottle 2.

In the apparatus described a series of bottles of the shape shown in FIG. 3 were blown under biaxial orientation conditions, heat set by contact with the hot mold and quenched to the temperature indicated in Tables 1 and 2. Then the pressure was released and the mold was opened. In two minutes each bottle, after release of the pressure, was filled with room temperature water and the volume measured by measuring the water used. Unless noted otherwise, each bottle was made from poly(ethylene terephthalate) having an inherent viscosity of 0.72 dl./gm. Various properties were obtained as indicated in the tables.

For comparison or control purposes, a bottle was blown identically to the others except that it was blown into a cold mold and cooled to 23° C. Thus, the control had no heat setting but was only biaxially oriented and not heat set, during the course of which its density increased to 1.3634 gms./cc. Its onset-of-shrinkage temperature was 46° C.

The bottles in the examples represented by the data in Tables 1 and 2 were made from injection molded parisons having the general shape shown in FIG. 1. They were 7.2 inches long with a wall thickness of 145–150 mils and weighed 26 gms. The parisons were preheated to about 190° F. (outside surface 190° F., inside surface 188° F.). The parison at this temperature was enclosed in the split halves of the blow mold, one-half of which is shown in FIG. 1. Then the stretch rod 22 was pushed against the bottom of the parison for 0.15 second before the blow pressure air was applied at 100 psig for 0.5 second, after which it was increased to 300 psig, and the stretch rod was maintained in the position shown on FIG. 2 for 2 seconds and was then retracted. At all times cold water circulated through lower mold section 6 and neck ring 4 so that the unexpanded neck was kept cold. The blown bottle is of course blown against the blow mold wall, which is maintained at the heat setting temperature shown in Table 1 or 2 for the time shown in the table. After this time, cold oil was circulated to replace the hot oil for the length of time needed to lower the temperature to the quench temperature shown in the tables. Once this temperature was reached, the bottle was exhausted to atmospheric and the mold was opened. The bottles are thereafter allowed to cool, eventually to room temperature, without internal pressure.

In the examples summarized in Tables 1 and 2, the bottles were all well-shaped unless indicated as "deformed". Also, the nominal overflow volume of the bottles with no shrinkage is about 522 cc.

TABLE 1

| Heat Setting | | Quench Temp. °C. | Density[1] gm./cc. | Volume | | Onset Temp. °C. |
|---|---|---|---|---|---|---|
| °C. | Sec. | | | 2 min.[2] | 24 hrs. | |
| | | | | cubic centimeters | | |
| 250 | 30 | 148 | 1.4013 | | | |
| 250 | 120 | 148 | 1.4022 | | | |
| 240 | 6 | 180 | 1.3980 | 497.9 | 497.4 | |
| 240 | 6 | 170 | 1.3980 | 501.9 | 501.6 | |
| 240 | 6 | 160 | 1.3980 | 506.2 | 506.1 | 184 |
| 240 | 6 | 150 | 1.3980 | 509.3 | 509.2 | |

TABLE 1-continued

| Heat Setting °C. | Heat Setting Sec. | Quench Temp. °C. | Density[1] gm./cc. | Volume 2 min.[2] cubic centimeters | Volume 24 hrs. cubic centimeters | Onset Temp. °C. |
|---|---|---|---|---|---|---|
| 240 | 6 | 130 | 1.3978 | 513.9 | 514 | 172 |
| 240 | 6 | 120 | 1.3978 | 516.1 | 515.9 | 168 |
| 240 | 6 | 110 | 1.3978 | 518.5 | 518.4 | — |
| 240 | 6 | 100 | 1.3965 | 519.4 | 519.7 | 154 |
| 240 | 6 | 90 | 1.3970 | 520.8 | 520.9 | 143 |
| 240 | 6 | 80 | 1.3986 | 521.7 | 521.7 | 139 |
| 240 | 6 | 80 | 1.3982 | none[3] | 521.8 | — |
| 240 | 6 | 60 | 1.3982 | 521.8 | 522.1 | 132 |
| 230 | 6 | 170 | 1.3950 | 493.1 | 493.6 | — |
| 230 | 6 | 160 | 1.3950 | 499.5 | 498.8 | 168 |
| 230 | 6 | 150 | 1.3950 | 504.1 | 503.8 | — |
| 230 | 6 | 140 | 1.3950 | 509.0 | 508.6 | |
| 230 | 6 | 129 | 1.3950 | 512 | 511.6 | 148 |
| 230 | 6 | 124 | 1.3947 | 514.1 | 513.7 | 138 |
| 230 | 6 | 100 | 1.3947 | 520.7 | 519.8 | 120 |
| 230 | 6 | 85 | 1.3945 | 521.1 | 520.6 | 113 |
| 230 | 6 | 75 | 1.3945 | 521.4 | 520.9 | 104 |
| 230 | 6 | 60 | 1.3950 | 521.8 | 521.8 | 88 |

[1]at mid-sidewall
[2]overflow volume measured by filling with room temperature water 2 minutes after opening mold.
[3]allowed to cool 24 hours in air without filling with water until then.

TABLE 2

| Heat Setting °C. | Heat Setting Sec. | Quench Temp. °C. | Density[1] gm./cc. | Volume 2 min.[2] cubic centimeters | Volume 24 hrs. cubic centimeters | Onset Temp. °C. | |
|---|---|---|---|---|---|---|---|
| 220 | 6 | 160 | 1.3912 | Deformed | | | |
| 220 | 6 | 150 | 1.3928 | 500.9 | 500.7 | | |
| 220 | 6 | 140 | 1.3910 | 502.9 | 502.9 | | |
| 220 | 6 | 135 | 1.3912 | 506.0 | 505.8 | 114 | |
| 220 | 6 | 120 | 1.3914 | 513.9 | 513.6 | 108 | |
| 220 | 6 | 110 | 1.3918 | 517.5 | 517.4 | 100 | |
| 220 | 6 | 100 | 1.3918 | 519.8 | 519.5 | 94 | |
| 220 | 6 | 90 | 1.3923 | 520.5 | 520.5 | 88 | |
| 220 | 6 | 80 | 1.3919 | 521.2 | 521.4 | 83 | |
| 220 | 6 | 60 | 1.3922 | 521.5 | 521.5 | 76 | |
| 200 | 6 | 140 | 1.3867 | Deformed | | | |
| 200 | 6 | 130 | 1.3867 | 496.5 | 495.7 | 102 | |
| 200 | 6 | 115 | 1.3868 | 513.0 | 513.0 | 95 | |
| 200 | 6 | 100 | 1.3877 | 519.9 | 519.8 | 84 | |
| 200 | 6 | 90 | 1.3870 | 519.9 | 520.0 | 80 | |
| 200 | 6 | 80 | 1.3860 | 520.8 | 520.4 | 78 | |
| 200 | 6 | 60 | 1.3872 | 521.0 | 520.8 | 74 | |
| 130 | 6 | 100 | 1.3702 | 509 | 508.4 | 74 | (Deformed) |
| 130 | 120 | 100 | 1.3744 | 512.2 | 511.7 | 74 | (Deformed) |

[1]at mid-sidewall
[2]overflow volume measured by filling with room temperature water 2 minutes after opening mold
[3]allowed to cool 24 hours in air without filling with water until then.

The last two examples are a repetition of the example in Jap. 77,672, infra. The bottles were misshapen, i.e., they were completely out of round, and of course, they have lower onset temperatures and the densities are lower than the products of the invention.

The bottles made at 250° C. heat setting temperature were made of 0.9 inherent viscosity PET.

From the results shown in Tables 1 and 2 it will be seen that I have discovered, surprisingly, that the onset-of-shrinkage temperature (for a given density oriented and heat set hollow article) becomes lower as the quench temperature becomes lower, even when the volume stays constant. Thus, I have discovered that higher quench temperatures, where the quenching takes place while the hollow article is restrained against shrinkage, gives higher onset-of-shrinkage temperatures.

In Table 3 are shown results of tests for the permeation of oxygen and of carbon dioxide for one-half liter bottles made according to the invention.

The determination procedures were as follows:

Carbon dioxide barrier properties of containers were determined by a gas chromatographic method. Containers were placed in a test fixture in which carbon dioxide gas at one atmosphere absolute was established and maintained at the outside surface and dry nitrogen gas at one atmosphere absolute at the inside surface. Carbon dioxide permeates through the wall from the outside to the inside of the container. The nitrogen gas inside the container was periodically sampled for permeated carbon dioxide with a gas chromatograph. The rate of carbon dioxide permeation was determined from the rate of increase of $CO_2$ concentration in the nitrogen gas inside the container. The system was calibrated by using an assayed calibrting gas of $CO_2$ in nitrogen supplied by Matheson Gas Products. Carbon dioxide test gas was moisturized to 50–100% relative humidity in the test fixture by evaporation of water from several sponges. Test temperature was controlled by placing the entire apparatus in a closed room which was controlled at 73°±2° F.

A method employing a Hersch coulometric detector was used to determine oxygen barrier properties of containers. The apparatus is similar to an Oxtran 100 Permeation Analyzer manufactured by Modern Controls, Elk River, Minn. A test fixture was used to establish oxygen and nitrogen gases at one atmosphere absolute at the outside and inside surfaces of the container respectively. Oxygen surrounding the outside surface was continuously replaced by a flowing gas stream which was vented to the atmospheric environment. The nitrogen gas inside the container was also a flowing system and served as a sweep gas. Oxygen permeated through the wall from the outside to the inside of the container where it was picked up by the nitrogen sweep gas and carried to the coulometric detector for measurement and venting to atmosphere. The output of the detector is directly proportional to the amount of oxygen it receives and calibration is computed from well established laws of electrochemistry. Both oxygen and nitrogen gases were moisturized by bubbling through tubes of water prior to entering the test fixture. Test temperature was controlled by placing the apparatus in a closed room which was maintained at 73°±2° F.

The results in the following Table 3 are for nominal one-half liter bottles made from parisons each weighing about 25.85 grams and made as described for the bottles in connnection with Tables 1 and 2. The control bottles were merely blown under orientation conditions as before described and quenched to near room temperature without heat setting while the heat set bottles were heat set at 241° C. as indicated.

TABLE 3

| Heat-Set Temperature °C. | Quench Temperature °C. | Oxygen Permeation (cc/day atm) | Carbon Dioxide Permeation (cc/day atm) | Density gms./cc. |
|---|---|---|---|---|
| control | | 0.126 | 0.830 | 1.3630 |
| control | | 0.128 | 0.760 | 1.3630 |
| control | | 0.125 | — | |
| control | | 0.125 | — | |
| average | | 0.126 | 0.795 | |
| 241 | 147 | 0.093 | 0.498 | 1.3996 |
| 241 | 148 | 0.087 | — | |
| 241 | 147 | 0.089 | 0.499 | 1.4000 |
| 241 | 147 | 0.090 | — | |
| average | | 0.090 | 0.498 | |
| Average Improvement | | 29% | 37% | |

The results illustrate the magnitude of the recognized improvement in the oxygen and carbon dioxide barrier properties of PET with increased density obtained by heat setting.

In an especially advantageous embodiment of the process of the invention the heat set hollow article is removed from the mold at heat-setting temperature and is cooled outside of the heat setting mold to the temperature of 100° C. or higher before designated prior to equalizing the internal pressure of the hollow article with the ambient atmosphere. After heat setting the pressure is reduced to a pressure which maintains its volume about the same as when within the mold, the mold is opened, and the bottle is cooled without confinement in a mold. This cooling can simply be air cooling in the room temperature air. When the desired quench temperature of 100° C. or higher is reached, the internal pressure is then released before further cooling. This specific process offers the shortest cycle time since no blow mold time is spent for quenching; it also results in the greatest energy savings since the blow mold can be kept at constant temperature.

The data for the ½ liter bottles shown in Table 4 was obtained using this embodiment of my process. The process was effected exactly as described in connection with the discussion of Tables 1 and 2, except modified as described in the previous two paragraphs herein. The pressure to which the bottles were adjusted and automatically held during the quench step is as shown. The cooling of the bottles to the "quench" temperature took place outside the mold with the outside surface thereof unrestrained so that the bottles simply cooled in the ambient room temperature air. The temperatures were estimated rather closely butr are not exact.

TABLE 4

| Heat Setting °C. | Sec. | Quench Press Psig | Temp. °C. | Density gms./cc. | Volume ccs. | Onset Temp. |
|---|---|---|---|---|---|---|
| 230 | 6 | 23 | 170 | 1.3950 | 491 | 163 |
| 230 | 6 | 23 | 115 | 1.3950 | 515 | 127 |

If one modifies this last embodiment of my invention—wherein the hollow article is removed under some pressure from the mold at heat setting temperature—so that the article outside the heat setting mold is allowed to cool under shrinkage-resisting pressure to below 100° C., as low as room temperature, e.g. 20° C., or even lower, the maximum benefit of higher onset-of-shrinkage temperatures is not realized, but the advantages of minimum cycle time and the energy savings still obtain. Accordingly, the invention includes this special embodiment; usually one cools to below 80° C., often below 70° C., before exhausting the air or other gas from the hollow article.

Thus, in many instances the higher onset-of-shrinkage temperature obtained when cooling to no lower than 100° C. before releasing the shrinkage resisting pressure, as in the principal embodiment of the invention, is not necessary for the particular end use of the hollow article.

To illustrate this last embodiment, a bottle was made in the same manner as in the 230° C. bottles summarized in Table 4 except that the heat setting temperature was 240° C. and the pressure was 17 psig and this pressure was not released until the bottle had cooled to about 70° C. in the ambient atmosphere. Its density was 1.3975 gms./cc., the bottle volume was 520.5 cc. and the onset-of-shrinkage temperature was 149° C.

When inherent viscosity is referred to herein, it is the viscosity as measured in a 60/40 weight ratio phenol/tetrachloroethane solution at 25° C. Density was determined by the method described in ASTM 1505, entitled "Density Gradient Technique".

As will be evident to those skilled in the art, various modifications of this invention can be made or followed in the light of the foregoing disclosure and discussion without departing from the spirit and scope of the disclosure or from the scope of the claims.

I claim:

1. A method for making a high density, partially crystalline, biaxially oriented, heat set, polyethylene terephthalate hollow container, the container having a body with oriented sidewalls, the method comprising the steps of:
   A. providing by blow molding a hollow article with oriented sidewalls,
   B. while the article is still under a shrinkage reducing pressure, increasing the density of the oriented sidewalls to at least about 1.391 g/cc by heating the sidewalls to a heat setting temperature equivalent to a temperature of about 220° C. to 250° C. to provide the density of at least about 1.391 g/cc,
   C. quenching the sidewalls while still under a shrinkage reducing pressure to provide the article with a shrinkage of less than about 5% of the volume and an onset of shrinkage temperature of at least about 105° C., the quenching being done at a temperature equivalent to that of about room temperature to 180° C. at a high heat setting temperature of 240° C., about 85° to 160° C. for a heat setting temperature of about 230° C., and about 120° C. to 150° C. for a lower heat setting temperature of about 220° C.

2. A method as defined in claim 1 in which the heat setting temperature is about 225° C. to 250° C. and the increased density of the sidewalls is above about 1.393 g/cc.

3. A method as defined in claim 1 in which the heat setting temperature is about 230° C. and the quenching temperature is about 100° C.

4. A method as defined in claim 1 in which the heat setting temperature is about 240° C. and the quenching temperature is about room temperature to 180° C.

5. A method as defined in claim 1 in which the heat setting temperature is about 230° C. and the quenching temperature is about 85° C. to 160° C.

6. A method as defined in claim 1 in which the heat setting temperature is about 220° C. and the quenching temperature is about 120° C. to 150° C.

7. A method of making a high density, partially crystalline, biaxially oriented, heat set, hollow poly(ethylene terephthalate) plastic article comprising
   (1) enclosing a tubular parison of said poly(ethylene terephthalate), having a closed end and an open end destined to form the neck or finish of the hollow article, within a blow mold which parison is at a first temperature range, which first temperature range is conducive to orientation during stretching;
   (2) while said parison is still at said first temperature range expanding said parison into contact and conformance with the blow mold walls by inflation with a gas under pressure to make a hollow blown article with oriented sidewalls, said stretching and expanding under the resulting strain conditions resulting in biaxial orientation and concomitant partial crystallization, and then while the article walls are still inflated in contact with said mold walls;
   (3) increasing the density of the oriented sidewalls to at least about 1.391 g/cc by raising the temperature of the article to a heat setting temperature in the range of about 220° to 250° C. to provide the density of at least about 1.391 g/cc, except for the neck or finish portion of said article which is kept at a low temperature such that crystallization is minimized or eliminated so that the neck or finish portion remains transparent, wherein the heating in said heat setting temperature range heat sets the body of said article by causing further crystallization thereof as indicated by density increase;
   (4) reducing the pressure to a pressure above atmospheric that will maintain said hollow article at essentially the same volume and resist shrinkage and then opening the mold;
   (5) and while said hollow article is still at a shrinkage-resisting pressure exceeding atmospheric, cooling said article to a quenching temperature sufficient to provide an onset of shrinkage temperature of at least about 105° C. and a volume shrinkage of less than about 5%, the quenching temperature being equivalent to about room temperature to 180° C. for a 240° C. heat setting temperature and about 85° C. to 160° C. for a heat setting temperature of about 230° C., and about 120° C. to 150° C. for a heat setting temperature of about 220° C., and
   (6) thereafter reducing the gas pressure within said article to essentially ambient pressure.

* * * * *